(12) United States Patent
Criel et al.

(10) Patent No.: US 9,242,551 B2
(45) Date of Patent: Jan. 26, 2016

(54) VENTILATION DEVICE FOR THE FUEL SYSTEM OF A HYBRID VEHICLE

(75) Inventors: Bjorn Criel, Sint-Martens-Lennik (BE); Vincent Cuvelier, Wuhan (CN); David Hill, Commerce Township, MI (US); Jules-Joseph Van Schaftingen, Wavre (BE)

(73) Assignee: Inergy Automotive Systems Research, Bruxelles (BE)

( * ) Notice: Subject to any disclaimer, the term of this patent is extended or adjusted under 35 U.S.C. 154(b) by 220 days.

(21) Appl. No.: 14/128,170

(22) PCT Filed: Jun. 18, 2012

(86) PCT No.: PCT/EP2012/061611
§ 371 (c)(1),
(2), (4) Date: Feb. 21, 2014

(87) PCT Pub. No.: WO2012/175456
PCT Pub. Date: Dec. 27, 2012

(65) Prior Publication Data
US 2014/0197188 A1    Jul. 17, 2014

(30) Foreign Application Priority Data
Jun. 21, 2011    (EP) .................................... 11170823

(51) Int. Cl.
*F02M 33/02*    (2006.01)
*B60K 15/035*    (2006.01)
(Continued)

(52) U.S. Cl.
CPC ..... *B60K 15/03504* (2013.01); *B60K 15/03519* (2013.01); *F02M 25/089* (2013.01);
(Continued)

(58) Field of Classification Search
CPC ................... B60K 15/03504; B60K 15/03519; B60K 2015/03276; B60K 2015/03296; B60K 2015/03514; B60K 2015/03571; B60K 2015/03576; F02M 25/089; Y10S 903/902
See application file for complete search history.

(56) References Cited

U.S. PATENT DOCUMENTS

| | | | | |
|---|---|---|---|---|
| 4,762,156 A | * | 8/1988 | Rich | F02M 25/0836 141/286 |
| 5,579,742 A | * | 12/1996 | Yamazaki | B60K 15/03504 123/516 |

(Continued)

FOREIGN PATENT DOCUMENTS

| | | |
|---|---|---|
| DE | 10 2009 036265 | 2/2011 |
| EP | 1 674 318 | 6/2006 |

OTHER PUBLICATIONS

International Search Report Issued Feb. 12, 2013 in PCT/EP12/61611 Filed Jun. 18, 2012.

(Continued)

*Primary Examiner* — Marguerite McMahon
*Assistant Examiner* — Tea Holbrook
(74) *Attorney, Agent, or Firm* — Oblon, McClelland, Maier & Neustadt, L.L.P.

(57) ABSTRACT

A ventilation device including: a first enclosure including a first passage configured to be connected to a canister outlet and the atmosphere, and a normally closed shutter device configured to open to release the first passage; a second enclosure including a second passage configured to be connected to the canister inlet and a fuel tank, and a normally open shutter device configured to close to shut the second passage, the second passage being separate from and not in communication with the first passage; and a combined pressure/vacuum relief valve or OPR and UPR valve pair situated in or fastened to a bypass of the first passage configured to establish a connection between ends of the first passage when the shutter device is closed and when there is over- or under-pressure in the ends. A fuel system can include the device and a hybrid vehicle can include the fuel system.

10 Claims, 3 Drawing Sheets

(51) Int. Cl.
  *F02M 25/08* (2006.01)
  *B60K 15/03* (2006.01)

(52) U.S. Cl.
  CPC ............ *B60K2015/03276* (2013.01); *B60K 2015/03296* (2013.01); *B60K 2015/03514* (2013.01); *B60K 2015/03571* (2013.01); *B60K 2015/03576* (2013.01); *Y10S 903/902* (2013.01); *Y10T 137/86324* (2015.04)

(56) References Cited

U.S. PATENT DOCUMENTS

| | | | |
|---|---|---|---|
| 5,687,697 A | 11/1997 | Ishikawa | |
| 5,775,307 A * | 7/1998 | Isobe | F02M 25/0809 123/198 D |
| 5,813,434 A * | 9/1998 | Horiuchi | B60K 15/03519 137/202 |
| 6,367,459 B1 * | 4/2002 | Yoshioka | F02D 41/0035 123/516 |
| 7,213,582 B2 | 5/2007 | Treudt et al. | |
| 7,448,367 B1 | 11/2008 | Reddy et al. | |
| 2001/0054415 A1 * | 12/2001 | Hanai | F02M 25/0809 123/520 |
| 2014/0197188 A1 * | 7/2014 | Criel | B60K 15/03519 220/746 |

OTHER PUBLICATIONS

European Search Report Issued Jan. 18, 2012 in EP 11170823 Filed Jun. 21, 2011.

* cited by examiner

VENTILATION DEVICE FOR THE FUEL SYSTEM OF A HYBRID VEHICLE

FIELD OF THE INVENTION

The present invention relates to a ventilation device for a hybrid vehicle fuel system, to a fuel system fitted with such a device, and to a hybrid vehicle including such a fuel system.

BACKGROUND OF THE INVENTION

A vehicle is generally said to be "hybrid" when it associates the use of a fuel-burning engine with the use of an electric motor.

In general terms, hybrid vehicles can be operated either by using only the electric motor, or only the engine, or both of them together, depending on the vehicle model.

One particular principle of operation is as follows:
  during stationary stages (when the vehicle is not moving), the engine and the motor are both stationary;
  on starting, it is the electric motor that causes the car to move, up to higher speeds (25 kilometers per hour (km/h) or 30 km/h);
  when higher speeds are reached, the engine takes over;
  in the event of hard acceleration, both the engine and the motor are observed to operate simultaneously, thus making it possible to achieve acceleration equivalent to that of an engine having the same power, or even greater acceleration;
  during a stage of deceleration and braking, kinetic energy is used for recharging the batteries (it should be observed that this function is not available on all of the hybrid vehicles presently available on the market).

It results from the above considerations that the engine does not run continuously and that under such circumstances, stages of purging the canister (an activated carbon filter to avoid dumping fuel vapor to the atmosphere) cannot be performed normally since during such stages possibly preheated air is caused to flow through the canister in order to regenerate it (i.e. to desorb the fuel vapor that has been absorbed therein), with this air then being admitted into the engine where it is burnt.

Under such circumstances, in order to avoid pointlessly loading the canister, communication between the tank and the canister is generally blocked by default; as a result the fuel tanks of such vehicles are generally put under pressure (typically pressure of about 300 mbar to about 400 mbar), with this generally being achieved by means of a functional element situated after the ventilation valves, often referred to as the fuel tank isolation valve (FTIV), that prevents the tank being ventilated (degassed) other than during filling situations. Such an element generally comprises two safety valves (rated at the lowest and highest pressures at which the tank can be used) with control that is generally electrical in order to enable the tank to be put to atmospheric pressure before it is filled.

The positioning of the FTIV in the system leads to problems in practice:
  if it is positioned upstream from the canister, it avoids vapors being sucked in from the tank while the canister is being purged, but in contrast it splits the fuel system into two zones, which makes it more difficult to comply with the tests required by the on-board diagnosis (OBD) regulations; and
  when positioned downstream from the canister, the situation is reversed: it facilitates OBD testing but it does not prevent vapor being sucked in from the tank, with this applying even though from the point of view of canister loading, there is no difference between the two positions (since even in the downstream position, given that there is no flow, there is no loading on the canister even if it is connected to the tank).

One solution to that problem consists in using two separate valves, one valve that is normally closed but that is opened to provide ventilation during filling, and another valve that serves to disconnect the tank from the canister during purging. By way of example, such a solution is described in U.S. Pat. No. 6,167,920 and U.S. Pat. No. 7,448,367, however it is expensive and generally requires recourse to electronics. Using mechanical control would increase the reliability and the robustness of the solution, would simplify it, and would reduce its costs, given the absence of electronics.

OBJECT AND SUMMARY OF THE INVENTION

The present invention seeks to solve those problems and to provide a simplified design that makes it possible to use a single ventilation device (i.e. or a single valve) and that does not require any recourse to electronics.

The invention is based on the idea of using a device that communicates both with the filler tube (in order to detect filling) and with the tank, the canister, and the atmosphere (in order to enable the tank to be ventilated while it is being filled and in order to enable its pressure to be regulated, while avoiding releasing fuel vapor into the atmosphere), there being two connections with the canister: one upstream and one downstream therefrom, so as to combine the advantages of the two possible positions while not suffering from their drawbacks.

The present invention thus provides a ventilation device comprising:

1) a first enclosure (I) comprising a first passage (1) suitable for being connected respectively to the outlet of a canister and to the atmosphere, and a normally closed shutter device (F) that is capable of opening in order to release the first passage (1);

2) a second enclosure (II) comprising a second passage (2) suitable for being connected to the inlet of a canister and to a fuel tank, and also a normally open shutter device (O) that is suitable for closing to shut the second passage (2), the second passage (2) being separate from the first passage (1) and not being in communication therewith inside the device; and 3) a combined pressure/vacuum relief valve or an overpressure relief and under-pressure relief valve pair situated in or fastened to a bypass of the first passage (1) so as to be able to establish a connection between the ends of said passage (1) when the shutter device (F) is closed and when there is over- or under-pressure from end to end of the passage.

The term "ventilation device" is used to mean one or more hollow elements that are connected together and suitable for being inserted in a ventilation system of a fuel system and for having fuel vapor passing therethrough.

To this end, the device comprises two enclosures (I, II), i.e. two walls (not necessarily as a single piece), each defining an inside volume having respective first and second passages (1, 2), i.e. subvolumes, each having an inlet and an outlet and defined by partitioning so as to force fuel vapor to flow from the inlet towards the outlet or vice versa, depending on the pressure difference.

Although the two internal volumes can communicate with each other and/or may include a portion in common, in contrast the two passages (1, 2) are isolated (they are not in communication with each other inside the device).

Preferably, the enclosures (I, II) are incorporated in a common housing. Preferably they are based on plastics material.

Preferably, the enclosures (I, II) have connections or endpieces at the ends of the passages (1, 2) in order to facilitate connecting them directly to the above-mentioned elements and/or to a line connected to those elements. These connections/endpieces are preferably made integrally with the walls of the enclosures. When the enclosures (I, II) are incorporated in a common housing made of plastics material, these endpieces are preferably integrally molded with the housing, preferably by injection molding.

Plastics materials that are suitable include polyamides (PA) and polyacetals such as poly-oxy-methylene (POM), which are easy to inject.

In the invention, the passages (1, 2) in the two enclosures (I, II) are each provided with a respective shutter device, i.e. a device generally having a movable element that, depending on its position, serves to open or to close said passages. Such devices may comprise floats (e.g. the conical floats described in application WO 2007/085585 in the name of the Applicant, the content of which is incorporated in the present application by reference for this purpose), membranes or diaphragms, . . . , or any other element that is movable either by mechanical action or by pneumatic action (fluid pressure). The shutter devices are preferably diaphragms.

The device of the invention also has a valve or a pair of valves for combined pressure/vacuum relief making it possible to ensure that the pressure inside the tank remains within a predetermined operating range. Such valves are well known to the person skilled in the art and generally comprise a shutter member (e.g. a ball) and a spring (or any other element mechanically opposing movement of the shutter member), the spring being rated appropriately so that it retracts and releases the shutter member only from a given pressure threshold. Depending on the orientation of the spring/shutter assembly, it serves to act as a safety valve against over-pressure or under-pressure.

In the invention, the (pair of) pressure/vacuum relief valve(s) is situated in or fastened on a bypass that bypasses the first passage (1). The term "bypass" is used to mean a passage (1') that establishes communication between points that are respectively upstream and downstream form the location in the passage (1) that the shutter device serves to shut.

The present invention also provides a fuel system fitted with a ventilation device as described above, and comprising for this purpose:

1) a canister having its outlet connected to one end of the first passage (1), the other end of the passage (1) being in communication with the atmosphere; said connector being connected via its inlet to one end of the second passage (2); and 2) a fuel tank connected to the other end of the second passage (2), said tank having a filler tube connected to the normally closed shutter device (F) of the first passage (1) in such a manner as to enable it to open on detecting a filling event.

The term "canister" is used generally to designate an enclosure containing a substance that absorbs fuel vapors, usually activated carbon. The role of the canister is to avoid releasing fuel vapor into the atmosphere. The enclosure has an inlet through which vapor from the fuel tank penetrates, and an outlet, through which air purified of the fuel vapor can escape. It should be observed that when the tank is in suction, air coming from the atmosphere flows from the outlet of the canister towards its inlet.

The fuel for which the invention is intended may be gasoline, diesel, biofuel, . . . , and it may have an alcohol content lying in the range 0 to 100%.

The term tank or filler tube is used to designate a hollow body generally made of metal or obtained by molding and/or coextruding plastics material(s), and intended respectively for storing and for filling the fuel storage volume.

The term "connected" as used herein generally designates being fastened directly on or connected via a connection line. In general, connection is made via a line. The connections to the inlets and outlets of the ventilation device are generally provided by lines that are constituted by hollow tubes allowing fuel vapor and air to pass therethrough. In contrast, the connection of the filler tube to the normally closed shutter device (F) of the first passage (1) is generally made by a "transmission" line, having the purpose of transmitting a signal indicative of the filler tube being opened/closed.

Such transmission may be:

1) mechanical: the transmission line then preferably comprises a cable that actuates (opens/closes) the shutter device;

2) pneumatic: the transmission line is then preferably under pressure. The creation of this pressure is used for causing the shutter device to move, or on the contrary for preventing the shutter device from moving. This solution presents difficulties in terms of dimensioning (space occupied at the head of the filler tube where it is necessary to provide room for a kind of piston) and for the final user (potential difficulty in putting the cap back into place and closing the hatch if it is necessary to compress the piston). In addition, if pressure is used for closing the shutter device, it is necessary to guarantee that this pressure persists over time, with this being guaranteed in spite of external parameters such as temperature or ambient pressure. It is then preferable to invert the above-described principle and to put the line under pressure only when it is desired to open the shutter device. Under such circumstances it is under pressure for only a very short length of time (the time taken to fill the tank) and it is possible to use greater tolerances on the pressure setpoint; and 3) magnetic and/or electronic, but those are specifically the expensive solutions that it is desired to avoid in the context of the present invention.

For these various reasons, the mechanical solution is preferred, particularly since the use of a cable is already effective on certain vehicles for opening the filler hatch from the vehicle driving seat.

In the fuel system of the invention, the connection line between the inlet of the canister and one end of the second passage (2) preferably includes a T-shaped portion or coupling/connection enabling a line coming from the engine vacuum to be tapped thereto, this line preferably being provided with a valve enabling the canister to be purged. Alternatively, the canister may be fitted directly with a third pipette (also making it possible to tap in a line going to the suction of the engine), a situation that is very widespread in practice.

In this variant, the normally open shutter device (O) of the second passage (2) may be connected (electro)magnetically to the engine control unit (ECU) in order to close the second passage (2) while purging the canister. Nevertheless, in a preferred variant, the enclosure II is in communication with the atmosphere (either directly or else via an orifice in communication with the first passage (1)) such that when the purge valve is open, the suction created in the second passage creates a pressure difference across the normally open shutter device (O) and causes it to close, thereby shutting off the second passage (2) and thus preventing vapor being sucked in from the fuel tank.

BRIEF DESCRIPTION OF THE DRAWING

The present invention is illustrated in non-limiting manner by accompanying FIGS. 1 to 3 which show certain preferred variants.

MORE DETAILED DESCRIPTION

Figure 1:
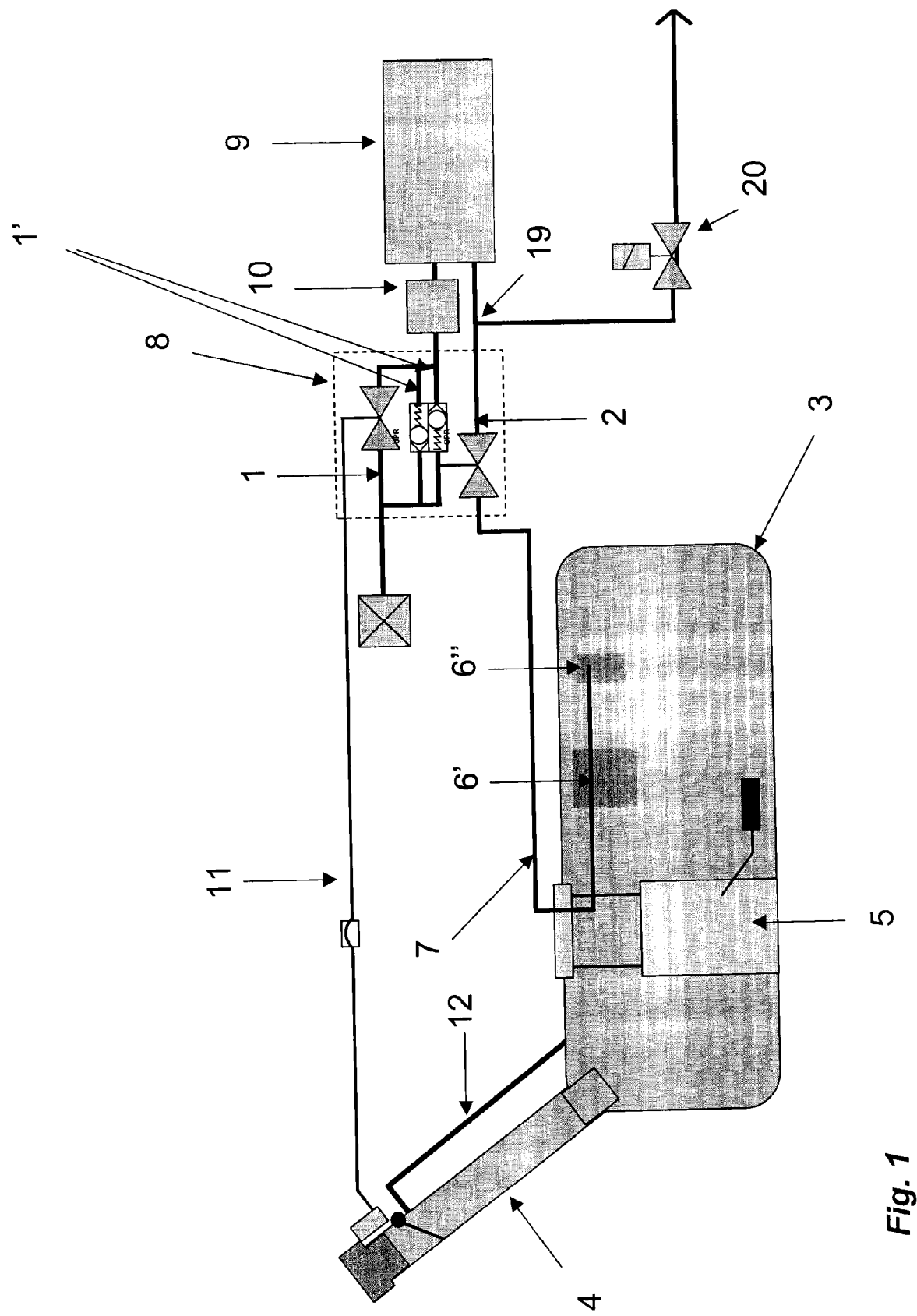
FIG. 1 shows in particular a fuel system of the invention.
Figure 2:
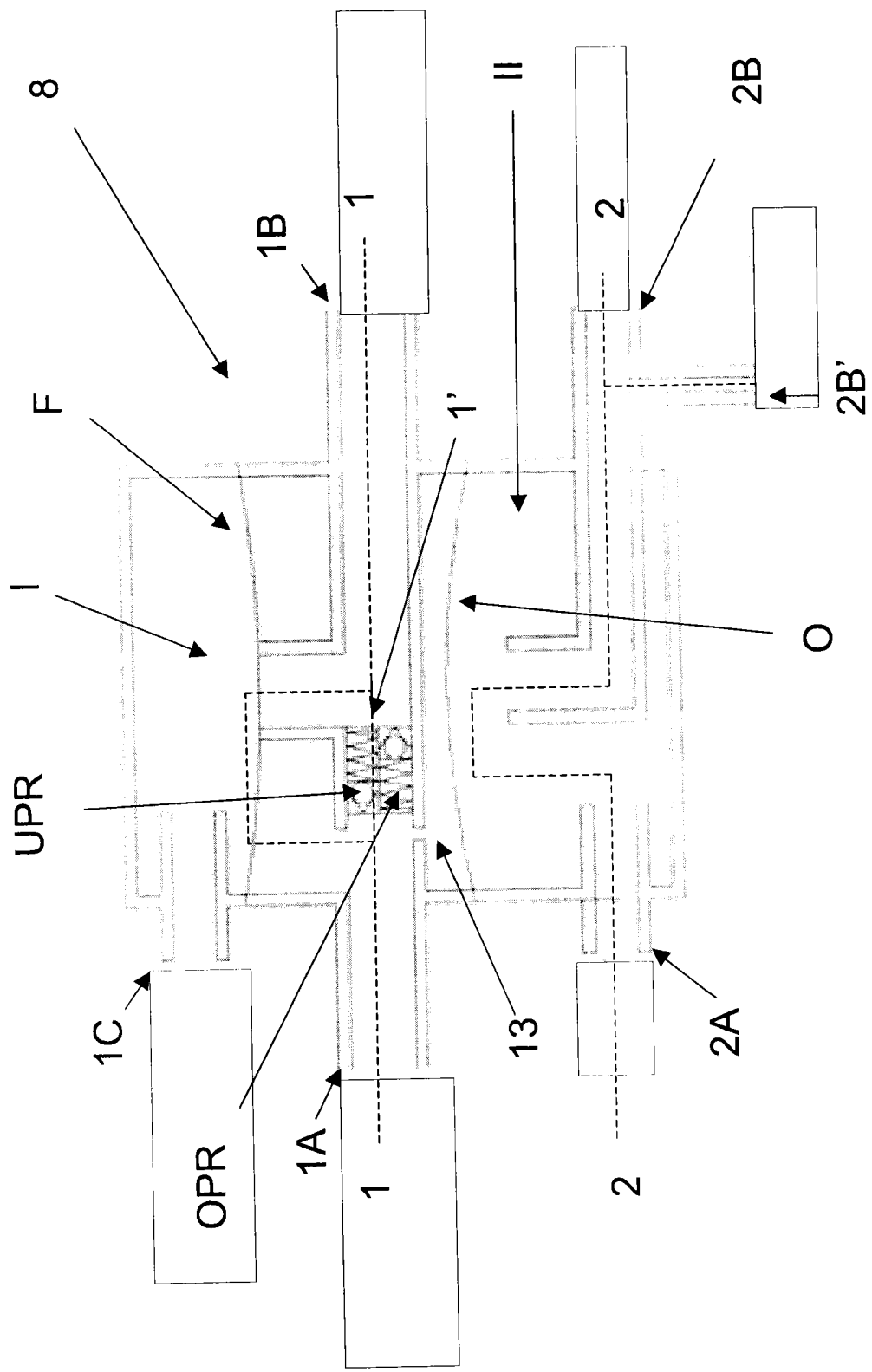
FIG. 2 shows a ventilation device of the invention.

The fuel system of FIG. 1 comprises a fuel tank (3) having a filler tube (4), a pump/gauge module (5), and ventilation valves such as a full limit vent valve (FLVV) (6) and a roll over valve (ROV) (6'), well known to the person skilled in the art, that are mounted on and in communication with a ventilation line (7) going from the tank (3) towards one end of the passage (2) through the ventilation device (8) of the invention (which device is shown diagrammatically in this figure, but is shown in detail in FIG. 2). The system also comprises a canister (9) from which there run two lines terminating at the ventilation device (8): one line having an OBD (10) fastened thereto and that is connected to one end of the first passage (1) in the device (8); and another line that is connected to one end of the second passage (2) of the device (8) and that includes a T-shaped coupling or connection (19) from which there runs a line connected to the vacuum of the engine (not shown), said line being provided with a purge valve (20) for the canister.

The fuel system of FIG. 1 also has a signal line (11) that goes from the ventilation device (8) to the top of the filler tube (4). This line transmits the signal relating to opening/closing of the hatch and/or of the cap to the device (8), and in particular to the normally closed shutter device (F) thereof.

Finally, the FIG. 1 fuel system also has a line (12) running from the top of the filler tube (4) and terminating in the vapor dome of the tank (3), with the role of this line being to make it possible to perform OBD tests as required by legislation in certain countries (such as the USA), the top of the filler tube forming part of the perimeter that requires OBD testing.

FIG. 2 is a schematic diagram in which the device for actuating the diaphragm is not shown, and it shows the ventilation device (8) that comprises:

1) an upper enclosure (I) provided with a diaphragm (F) having the role (by default) of closing the first passage (1) between the atmosphere and the canister on a continuous basis, except while the tank is being filled;

2) a lower enclosure (II) also provided with a diaphragm (O) that is open by default but that has the role of closing the second passage (2) between the tank and the canister while purging the canister; and 3) a pair of valves comprising an over-pressure relief (OPR) valve and an under-pressure relief (UPR) valve or a combined pressure/vacuum relief valve (P/VRV) for guaranteeing tank safety and avoiding its internal pressure becoming too extreme. The following ratings may be envisaged (list non-exhaustive): [−90 mbar, +150 mbar]; [−200 mbar, +200 mbar]; [−150 mbar, +350 mbar], . . . .

The ventilation device (8) shown in FIG. 2 operates as follows:

In both static (parked) and dynamic (running) ventilation operation, the first passage (1) is closed by the diaphragm (F). If the internal pressure reaches the threshold of the OPR valve then it opens. The path followed by the stream of air is then as follows: pass from the tank to the endpiece 2A of the device (8) in order to enter into the passage 2; leave the device via the endpiece 2B of the passage (2); enter the canister (not shown in FIG. 2), where vapor is trapped; leave the canister to enter the device (8) via the pipette 1B of the passage 1; and pass through the OPR valve so leave the device (8) via the endpiece (1A) and escape to the atmosphere, possibly by passing via an air filter. If the pressure reaches the threshold pressure of the UPR valve, then the path followed by the stream of air is naturally the same, but in the opposite direction.

In operation while purging the canister, the purge valve (not shown in this figure) opens and creates suction (typically about −200 mbar to about −400 mbar), which suction spreads in particular to the upper and lower enclosures (I, II) via the connection endpiece 2B' leading to the vacuum line of the engine. In the upper chamber (I), the threshold pressure of the UPR valve is reached, it opens, and air begins to enter. In the lower chamber (II) the diaphragm (F) is pressed against its seat. The diaphragm is subjected to a pressure difference between its top and bottom faces causing the diaphragm to move downwards as soon as the upper zone of the lower enclosure (II) (over the diaphragm) is at atmospheric pressure as a result of a small orifice (13) that connects this zone to the passage 1 (at atmospheric pressure), and the lower zone of this enclosure (II) (under the diaphragm) is at reduced pressure. The tank is momentarily disconnected from the canister by the passage (2) in the lower enclosure (II) closing, thereby preventing vapor being sucked in from the tank while the canister is being purged.

Operation during filling takes place as follows: prior to filling, the user opens the hatch and removes the cap. One of these two events is used to actuate the diaphragm (F) of the upper chamber via the connection 10. The diaphragm (F) then rises and releases the passage (1) in the upper enclosure (I). The path followed by the gas flow is then as follows: from the tank, enter into the device (8) via the endpiece 2A; leave via the endpiece 2B in order to enter into the canister where vapor is trapped; leave the canister and enter into the device (8) via the endpiece 1A; and escape to the atmosphere, possibly after passing through an air filter. At the end of filling, the cap is put back into place and the hatch is closed. One of these two events causes the diaphragm (F) to be put back into place (and held in that position).

From the above, it can clearly be seen that the enclosure (I) is downstream from the canister in this mode of operation and that the enclosure (II) is upstream therefrom. The enclosure performing the main function of the FTIV (shutting off the vent line except during filling situations) is the downstream enclosure (I). The upstream enclosure (II) serves to avoid sucking in fuel vapor from the tank while purging the canister.

Figure 3:
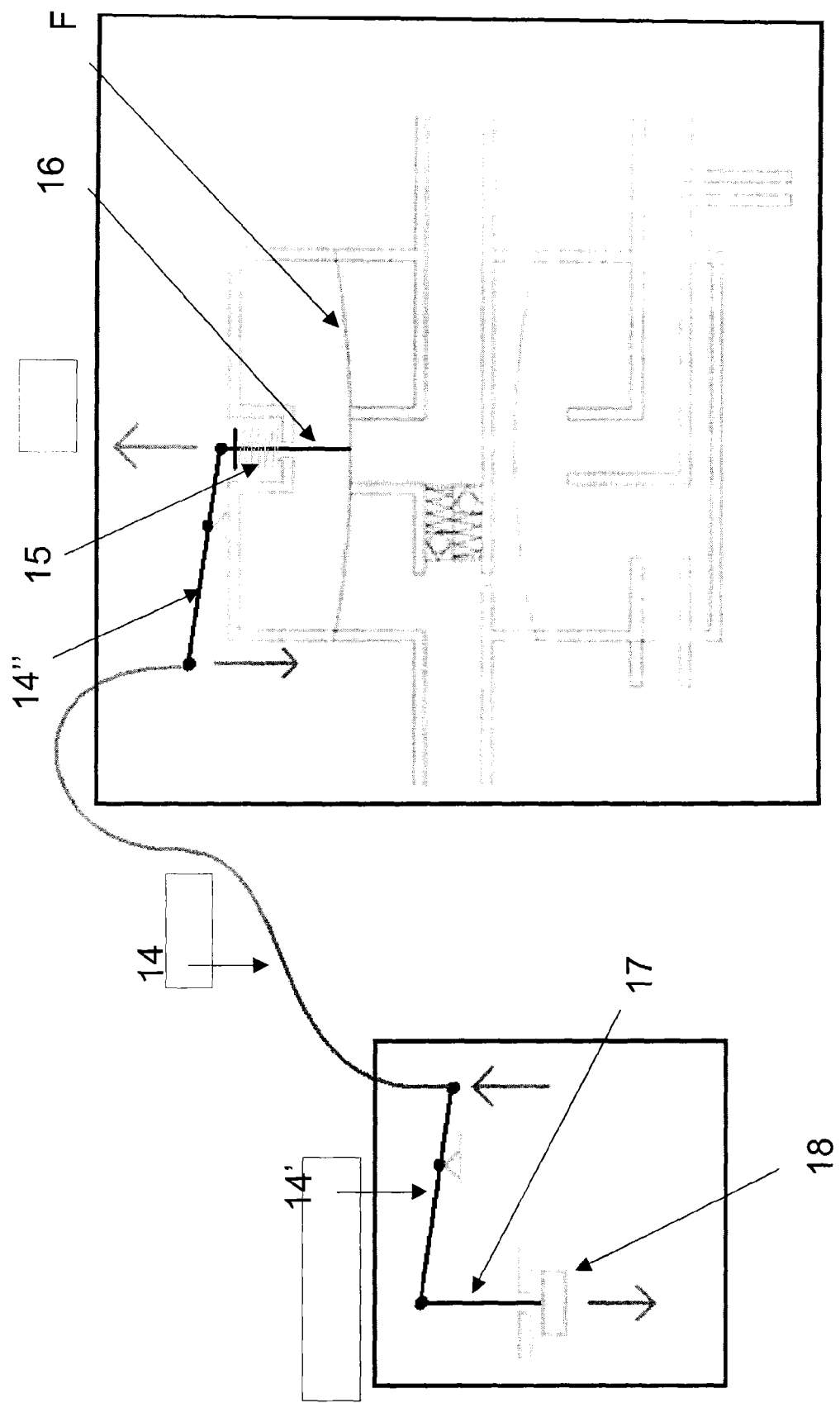
FIG. 3 shows a preferred variant of mechanical activation for said device.

FIG. 3 shows the use of a cable (14) as an actuator of the shutter (F). This option can involve certain design constraints:

1) it is better for such a cable to be actuated in traction than in thrust, in order to be sure that it does not jam in its sheath; and 2) it must be ensured that the force required for activating the cable is not too great (so as not to hinder the final user), nor too small (in order to ensure that the device (8) is leaktight).

In order to mitigate those various points, a system using two lever arms is put into place in the variant shown at respective ends of the cable (14), the two lever arms (14', 14") making it possible:

to ensure that the cable (14) slides while being pulled; and
to increase the force exerted by the final user and ensure that the device (8) remains closed in leaktight manner in spite of the internal pressure generated in the fuel system.

The arrows in FIG. 3 show the movements that take place during opening of the hatch and/or removal of the cap; a spring (15) positioned in the device (8) can then relax and in so doing actuate a rod (16) that pulls the diaphragm (F) upwards. At the other end of the cable, a rod (17) drives a pushbutton (18) outwards. When the cap is put back into place or the hatch is closed, the user presses on the pushbutton (18). This actuates the lever arm (14') situated at the top of the filler tube, which arm in turns pulls on the cable (14). At the other end of the cable (14), the cable pulls on the lever arm (14") which in turn pushes the rod (16) downwards, thereby compressing the return spring and pushing the diaphragm back downwards, closing the passage (1).

What is claimed is:

1. A ventilation device comprising:
    a first enclosure including a first passage configured to be connected respectively to an outlet of a canister and to an atmosphere, and a normally closed shutter device configured to open to release the first passage;
    a second enclosure including a second passage configured to be connected to an inlet of the canister and to a fuel tank, and a normally open shutter device configured to close to shut the second passage, the second passage being separate from the first passage and not being in communication therewith inside the device; and
    a combined pressure/vacuum relief valve or an OPR and UPR valve pair situated in or fastened to a bypass of the first passage configured to establish a connection between ends of the first passage when the shutter device is closed and when there is over-pressure or under-pressure from end to end of the first passage.

2. A device according to claim 1, wherein the enclosures are incorporated in a common housing.

3. A device according to claim 2, wherein the enclosures include connections or endpieces at ends of the respective passages, the endpieces being integrally molded with the housing by injection molding a plastics material.

4. A device according to claim 1, wherein the shutter devices include diaphragms.

5. A fuel system fitted with a device according to claim 1, further comprising:
    the canister having its outlet connected to one end of the first passage, the other end of the passage being in communication with the atmosphere; the connector being connected via its inlet to one end of the second passage; and
    a fuel tank connected to the other end of the second passage, the fuel tank including a filler tube connected to the normally closed shutter device of the first passage to enable it to open on detecting a filling event.

6. A fuel system according to claim 5, wherein the connection of the filler tube to the normally closed shutter device of the first passage takes place via a transmission line for transmitting a signal representing the filler tube being opened/closed.

7. A fuel system according to claim 6, wherein the transmission takes place mechanically, and wherein the transmission line includes a cable that actuates the normally closed shutter device.

8. A system according to claim 6, further comprising a connection line between the inlet of the canister and one end of the second passage, the connection line including a T-shaped portion or coupling/connection enabling a line coming from an engine vacuum to be tapped thereto, the connection line including a valve enabling the canister to be purged.

9. A system according to claim 8, wherein the normally open shutter device of the second passage is in communication with the atmosphere, either directly or via an orifice communicating with the first passage.

10. A hybrid vehicle comprising a fuel system according to claim 5.

* * * * *